United States Patent
Danysh et al.

(10) Patent No.: US 10,346,133 B1
(45) Date of Patent: Jul. 9, 2019

(54) SYSTEM AND METHOD OF FLOATING POINT MULTIPLY OPERATION PROCESSING

(71) Applicant: QUALCOMM Incorporated, San Diego, CA (US)

(72) Inventors: Albert Danysh, Austin, TX (US); Erich Plondke, Austin, TX (US); Eric Mahurin, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 15/851,390

(22) Filed: Dec. 21, 2017

(51) Int. Cl.
G06F 7/487 (2006.01)
G06F 7/485 (2006.01)

(52) U.S. Cl.
CPC ............ *G06F 7/4876* (2013.01); *G06F 7/485* (2013.01)

(58) Field of Classification Search
CPC ........ G06F 7/485; G06F 7/487; G06F 7/4876; G06F 7/499–7/49921; G06F 7/49936
See application file for complete search history.

(56) References Cited

U.S. PATENT DOCUMENTS

| | | |
|---|---|---|
| 5,267,186 A | 11/1993 | Gupta et al. |
| 7,769,981 B2 | 8/2010 | Lyuh et al. |
| 8,019,805 B1 * | 9/2011 | Sarma ............... G06F 7/4876 708/503 |
| 8,180,822 B2 | 5/2012 | Rarick |
| 9,378,018 B2 | 6/2016 | Hansen et al. |
| 9,519,459 B2 | 12/2016 | Kim et al. |
| 2010/0042665 A1 * | 2/2010 | Ahmed ............... G06F 7/485 708/209 |
| 2013/0132452 A1 * | 5/2013 | Korsa ............... G06F 7/483 708/204 |

OTHER PUBLICATIONS

E. M. Schwarz, M. Schmookler and S. D. Trong, "FPU implementations with denormalized numbers," in IEEE Transactions on Computers, vol. 54, No. 7, pp. 825-836, Jul. 2005 (Year: 2005).*

J. Jourdan-Lu, "Custom floating-point arithmetic for integer processors: algorithms, implementation, and selection," Ph.D. thesis, Université de Lyon—ENS de Lyon, France, Nov. 2012 (Year: 2012).*

"IEEE Standard for Floating-Point Arithmetic; IEEE Std 754-2008 ED—Anonymous", IEEE Standard; [IEEE Standard], IEEE, Piscataway, NJ, USA, Aug. 29, 2008 (Aug. 29, 2008), pp. 1-58, XP017604142, ISBN: 978-0-7381-5752-8.

(Continued)

*Primary Examiner* — Matthew D Sandifer
(74) *Attorney, Agent, or Firm* — Toler Law Group, PC

(57) ABSTRACT

A processor includes an integer multiplier configured to execute an integer multiply instruction to multiply significand bits of at least one floating point operand of a floating point multiply operation. The processor also includes a floating point multiplier configured to execute a special purpose floating point multiply accumulate instruction with respect to an intermediate result of the floating point multiply operation and the at least one floating point operand to generate a final floating point multiplication result.

20 Claims, 4 Drawing Sheets

(56) References Cited

OTHER PUBLICATIONS

Akkas A., et al., "A Quadruple Precision and Dual Double Precision Floating-Point Multiplier", Digital System Design, 2003, Proceedings, Euromicro Symposium on Sep. 1-6, 2003, Piscataway, NJ, USA, IEEE, Sep. 1, 2003 (Sep. 1, 2003), pp. 76-81, XP032159056, DOI: 10.1109/DSD.2003.1231903, ISBN: 978-0-7695-2003-2, Section 2.
De Soras L: "Denormal Numbers In Floating Point Signal Processing Applications", Apr. 19, 2005 (Apr. 19, 2005), XP055568621, pp. 1-10, Section 1.2, 3.1, Retrieved from the Internet: URL: http://ldesoras.free.fr/doc/articles/denormal-en.pdf [retrieved on Mar. 13, 2019].
International Search Report and Written Opinion—PCT/US2018/065034—ISA/EPO—dated Mar. 27, 2019.
Motorola: "Motorola Data Arithmetic Logic Unit 3-1 Section 3 Data Arithmetic Logic Unit", Jan. 1, 1995 (Jan. 1, 1995), XP055568203, pp. 1-20, Section 3.4, Retrieved from the Internet: URL: http://lars.nocrew.org/computers/processors/DSP56000/DSP56000FM03.pdf [retrieved on Mar. 13, 2019].

\* cited by examiner

SYSTEM AND METHOD OF FLOATING POINT MULTIPLY OPERATION PROCESSING

I. FIELD

The present disclosure is generally related to processors, and more specifically related to floating point multiply instruction processing.

II. DESCRIPTION OF RELATED ART

Advances in technology have resulted in more powerful computing devices. For example, computing devices such as laptop and desktop computers and servers, as well as wireless computing devices such as portable wireless telephones, have improved computing capabilities and are able to perform increasingly complex operations. Increased computing capabilities have also enhanced device capabilities in various other applications. For example, vehicles may include processing devices to enable global positioning system operations or other location operations, self-driving operations, interactive communication and entertainment operations, etc. Other examples include household appliances, security cameras, metering equipment, etc., that also incorporate computing devices to enable enhanced functionality, such as communication between internet-of-things (IoT) devices.

A computing device may include a processor to execute program instructions. For example, the processor may execute arithmetic instructions, such as a multiply instruction, to perform graphics processing, data encoding, or encryption, as illustrative examples. The processor may operate on various types of data, such as integers or floating point numbers.

A floating point number is typically represented by a sign bit, an exponent value, and a significand (mantissa) that consists of the significant digits of the number. Multiplication of two floating-point numbers includes addition of the exponent values and multiplication of the mantissas. Multiplication of two numbers that are formatted as double precision numbers according to an Institute of Electronics and Electrical Engineers (IEEE)-754 standard includes multiplying two 53-bit significands, which may require a dedicated 64-bit multiplier in a processor that is otherwise configured to operate on smaller values (e.g., 32-bit). Alternatively, the processor may convert a double-precision multiply instruction into a looping operation that performs multiple partial multiplications of smaller values and assembles the partial results to generate a double-precision result. However, including the dedicated 64-bit multiplier may increase a size and cost of the processor, while conversion of the instruction into the looping operation introduces additional complexity and routing logic into the processor.

III. SUMMARY

In a particular aspect, a processor includes an integer multiplier configured to execute an integer multiply instruction to multiply significand bits of at least one floating point operand of a floating point multiply operation. The processor also includes a floating point multiplier configured to execute a special purpose floating point multiply accumulate instruction with respect to an intermediate result of the floating point multiply operation and the at least one floating point operand to generate a final floating point multiplication result.

In another aspect, a method of performing a floating point multiply operation at a processor includes executing a plurality of integer multiply instructions to generate an intermediate result. The method also includes executing a special purpose floating point multiply accumulate instruction with respect to the intermediate result and at least one floating point operand of the floating point multiply operation to generate a floating point multiplication result.

In another aspect, an apparatus includes means for executing a plurality of integer multiply instructions to generate an intermediate result. The apparatus also includes means for executing a special purpose floating point multiply accumulate instruction with respect to the intermediate result and at least one floating point operand to generate a final floating point multiplication result.

In another aspect, a method includes identifying a first operand of a multi-operand multiply operation as denormal and, in response to determining that an exponent of a second operand of the multi-operand operation is larger than a threshold, modifying a value of at least one of the first operand or the second operand.

One particular advantage provided by at least one of the disclosed aspects is the ability to perform a floating point multiply operation without requiring specialized floating point multiplication circuitry that has sufficient bit width to perform single-cycle floating point multiplication. For example, multiplication of two 64-bit double-precision numbers can be performed using an integer multiplier and a floating point multiplier that is sized to multiply two 32-bit numbers. Using reduced-sized components enables reduced processor cost, area, and power consumption as compared to using specialized floating point multiplication circuitry having greater width. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
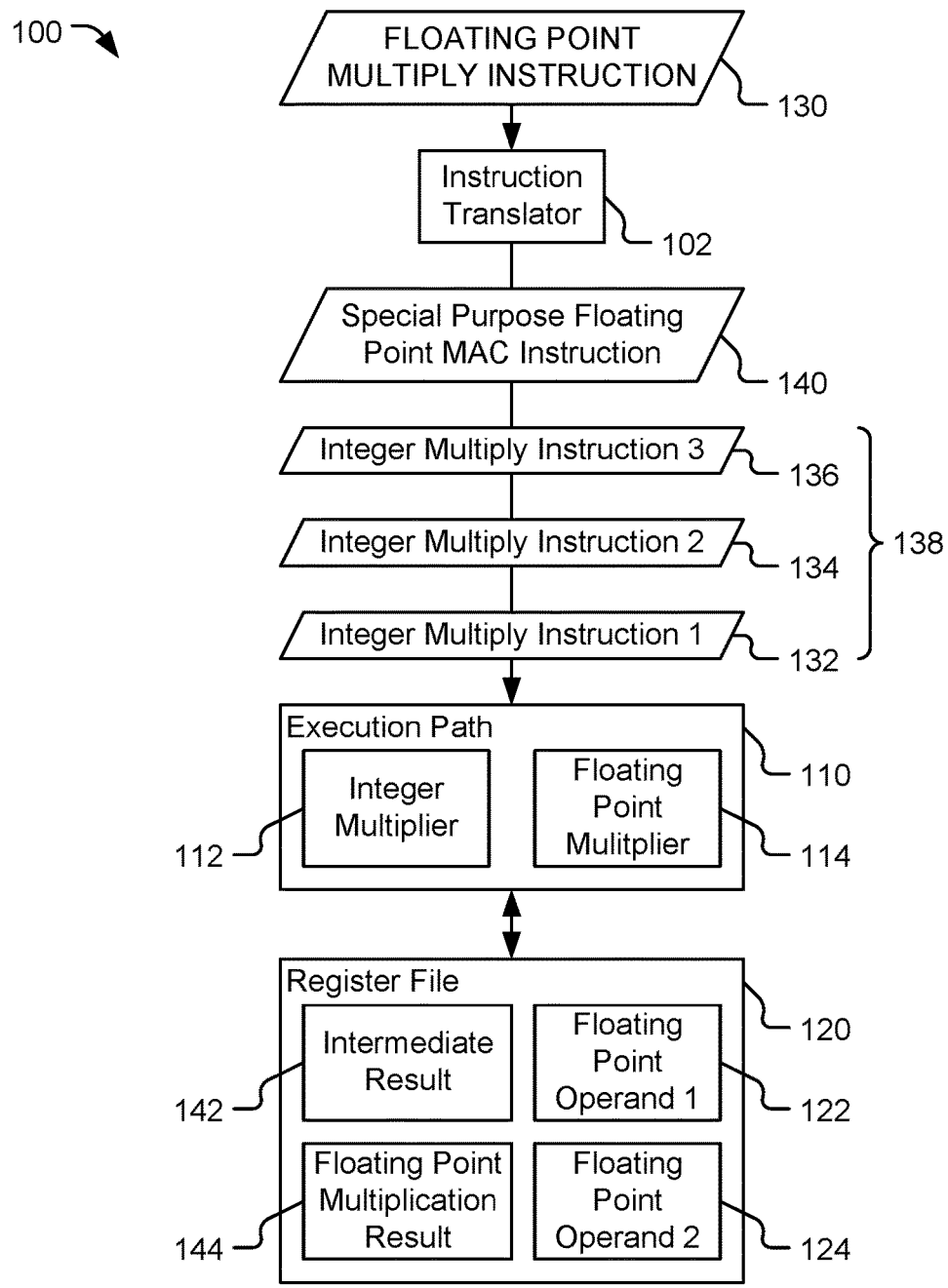
FIG. 1 is a block diagram of a particular implementation of a processor configured to perform a floating point multiply operation using multiple integer multiply instructions and a special purpose floating point multiply instruction.

FIG. 1 depicts a processor 100 that includes an instruction translator 102, an execution path 110, and a register file 120. The processor 100 is configured to perform a floating point multiply operation indicated by a floating point multiply instruction 130 by executing a plurality of integer multiple instructions 138 and a special purpose floating point multiply-accumulate (MAC) instruction 140. Execution of the plurality of integer multiple instructions 138 and the special purpose floating point MAC instruction 140 enables the processor 100 to multiply two operands having large bit width using components configured to process operands having smaller bit widths, reducing the cost and size of the processor 100 as compared to processors having a dedicated full-precision multiplier and reducing processor routing logic and complexity as compared to executing the multiply instruction 130 using a "quadruple pump" looping operation.

The instruction translator 102 is configured to receive a floating point multiply instruction 130 and to translate the floating point multiply instruction 130 into a plurality of integer multiply operations 138 and a special purpose floating point multiply accumulate (MAC) instruction 140 to be executed. In some implementations, the instruction translator 102 is an instruction decoder within a scheduling unit of the processor 100.

The execution path 110 is configured to execute each of the instructions of the plurality of instructions 138 and the special purpose floating point MAC instruction 140. The execution path 110 includes an integer multiplier 112 and a floating point multiplier 114. The integer multiplier 112 includes circuitry configured to multiply integer values to generate output values. The floating point multiplier 114 includes circuitry configured to multiply one or more floating point operands to generate a floating point multiplication result.

The register file 120 is configured to hold values to be accessible to the execution path 110. For example, the register file 120 may include one or more physical registers configured to store values corresponding to a first operand 122 of the floating point multiply instruction 130, a second operand 124 of the floating point multiply instruction 130, one or more intermediate results 142 generated by the integer multiplier 112 as a result of executing one or more of the plurality of integer multiply instructions 138, and a final floating point multiplication result 144 of the floating point multiply instruction 130.

The plurality of integer multiply instructions 138 includes a first instruction 132, a second instruction 134, and a third instruction 136. Each of the instructions 132-136 is configured to cause the integer multiplier 112 to multiply a selected portion of the first floating point operand 122 to another selected portion of the second floating point operand 124 where the selected portions have a smaller number of bits than the floating point operands 122, 124. For example, because floating point multiplication may require a floating point multiplier that has a bit width that is approximately twice as large as the size of the largest floating point operand 122 or 124, inclusion of a full-size floating point multiplier may be prohibitively expensive. However, by performing integer multiplications of selective portions of the floating point operands 122, 124, each of the integer multiply instructions 132-136 multiply operands that have a reduced bit width as compared to the operands 122, 124. The special purpose floating point MAC instruction 140 is configured to multiply a most significant portion of the first floating point operand 122 and a most significant portion of the second floating point operand 124 and to accumulate (add) the product to an intermediate result 142 that is generated as a result of executing the instructions 132-136.

Because the special purpose floating point MAC instruction 140, which is executed at the floating point multiplier 114, is performed using a portion of the floating point operands 122-124 rather than using the full bit width of the floating point operands 122, 124, the floating multiplier 114 has a reduced bit width as compared to a full-precision floating point multiplier. Thus, the processor 100 is configured to perform a floating point multiply operation by executing the plurality of integer multiply instructions 138 to generate the intermediate result 142 and executing the special purpose floating point MAC instruction 140 with respect to the intermediate result 142 and the floating point operands 122, 124 to generate the final floating point multiplication result 144. Further details of the particular implementation of the instructions 132-136 and 140 are described in further detail with reference to FIG. 2.

Although the instruction translator 102 is described as a component of the processor 100, in other implementations the instruction translator 102 is not a component of the processor 100 and instead is a component that translates instructions prior to execution at the processor 100. In a particular implementation, the instruction translator 102 is within a compiler and is configured to translate the user input floating point multiply instruction 130 into a sequence of instructions that includes the plurality of integer multiply instructions 138 and the special purpose floating point MAC instruction 140.

Although the integer multiplier 112 is illustrated as distinct from the floating point multiplier 114, in some implementations one or more components, such as a multiplier circuit that supports multiplies for either integer or floating point instructions, are shared between the integer multiplier 112 and the floating point multiplier 114. In an illustrative, non-limiting example, the execution path 110 includes an integer multiply-accumulator (MAC) unit with a multiplier circuit that corresponds to the integer multiplier 112 and that is accessible by the floating point multiplier 114 to perform at least a portion of a floating-point multiply operation. Each of the integer multiplier 112 and the floating point multiplier 114 may include separate hardware to support integer or floating point instructions, respectively, and may also include shared hardware resources (e.g., a multiplier of an integer MAC unit).

Although FIG. 1 depicts a single execution path 110 that includes the integer multiplier 112 and the floating point multiplier 114 for clarity of explanation, in other implementations the processor 100 may include multiple execution paths that are configured to execute instructions in parallel. In some implementations, the integer multiplier 112 and the floating point multiplier 114 are in separate execution paths are duplicated in multiple execution paths. In some implementations, the integer multiplier 112 and the floating point multiplier 114 are incorporated in a single multiplier circuit. Although in some implementations the instructions 132-140 are executed as a serial stream of instructions, in other implementations two or more of the instructions 132-140 are executed in parallel.

Figure 2:
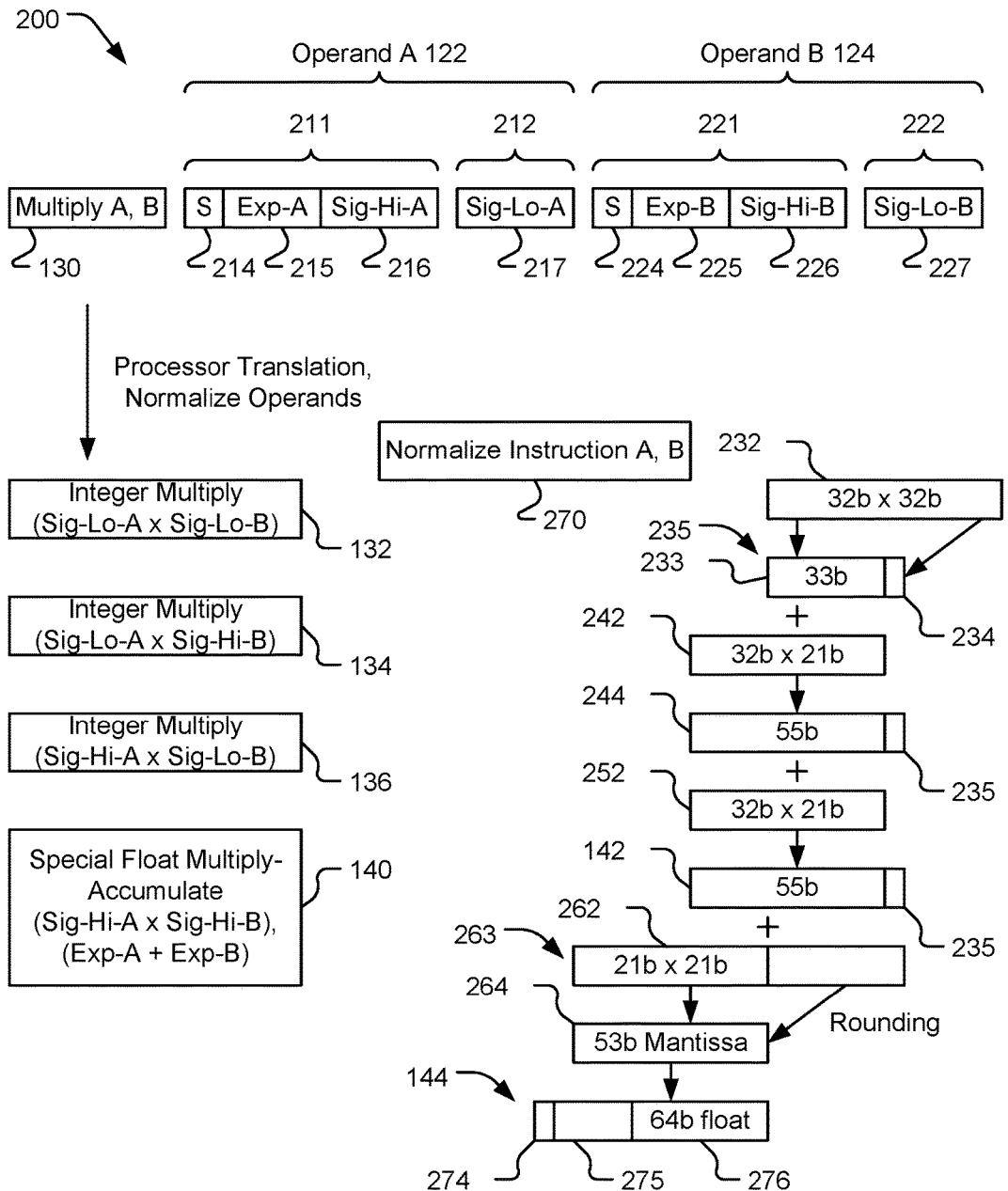
FIG. 2 is a diagram illustrating a particular implementation of the floating point multiply operation of FIG. 1.

FIG. 2 depicts an example 200 of performing a floating point multiply operation at the processor 100 according to a particular implementation. The floating point operation is responsive to receiving the floating point multiply instruction 130 to multiply the first floating point operand "A" 122 with the second floating point operand "B" 124. Operand A 122 includes a first 32-bit portion 211 and a second 32-bit portion 212. The first portion 211 includes a sign bit 214, an exponent value 215, and high-order significand bits (Sig-Hi-A) 216. The second portion 212 includes low-order significand bits (Sig-Lo-A) 217. For example, the significand of A may include 53 bits, with 21 bits in Sig-Hi-A 216 and 32 bits in Sig-Lo-A 217. Operand B 124 includes a first 32-bit portion 221 and a second 32-bit portion 222. The first portion 221 includes a sign bit 224, an exponent value 225, and high-order significand bits (Sig-Hi-B) 226. The second portion 222 includes low-order significand bits (Sig-Lo-B) 227.

The multiply command 130 is translated into (e.g., replaced by) the integer multiply instructions 132, 134, 136 and the special purpose floating point multiply accumulate instruction 140. The integer multiply instructions 132, 134, 136 are executed to generate the intermediate result 142, and the special purpose floating point multiply accumulate instruction 140 is executed to generate the final floating point multiplication result 144.

Executing the first integer multiply instruction 132 causes the integer multiplier 112 (which is a 32-bit multiplier in the example 200) to perform integer multiplication of low-order significand bits Sig-Lo-A 217 of the first operand 122 with the low-order significand bits Sig-Lo-B 227 of the second operand 124 to generate a 64-bit value 232. The 32 low-order bits of the value 232 are removed (e.g., truncated or rounded) to generate a 32-bit value 233 as a reduced-length version of the 64-bit value 232. A "sticky bit" 234 is also generated as a dedicated bit to indicate whether the 32-bit value 233 is inexact (i.e., whether any of the 32 low-order bits of the value 232 has a "1" value). The 32-bit value 233 and the sticky bit 234 form a 33-bit value 235.

In an example, the first integer multiply instruction 132 is a double float multiply low-low (DFMPYLL) instruction that multiplies two 32-bit unsigned word (uw) operands from register locations RssV.uw[0] (e.g., portion 212 storing Sig-Lo-A 217) and RttV.uw[0] (e.g., portion 222 storing Sig-Lo-B 227) and stores a 33-bit value into register RddV as follows:

```
DFMPYLL
{
    /*multiply low-order significand bits of operands, store result into prod*/
    prod = RssV.us[0] * RttV.uw[0];
    /*store into RddV a value equal to the result of right-shifting prod by 31
    bits, and write a 0 value into the 0th bit of RddV*/
    RddV = (prod >> 32) << 1;
    /*if the least significant 32 bits of prod has a non-zero value, set the 0th bit of RddV to "1" as a sticky bit*/
    if (prod.uw[0] != 0) RddV.0 = 1;
}
```

Example 1

Executing the second integer multiply instruction 134 causes the 32-bit integer multiplier 112 to perform integer multiplication of the low-order significand bits of the first operand, Sig-Lo-A 217, with high-order significand bits of the second operand, Sig-Hi-B 226, to generate a 53-bit value 242. The 53-bit value 242 is added to the 32-bit value 234 to generate a 55-bit value 244 (including the sticky bit 235).

In an example, the second integer multiply instruction 134 is a double float multiply low-high (DFMPYLH) instruction that multiplies a first, 32-bit operand from RssV.uw[0] (e.g., portion 212 storing Sig-Lo-A 217) to a second, 21-bit operand from RttV.uw[1] (e.g., Sig-Hi-B 226 from portion 221). The result of the multiplication is accumulated with (added to) the value in the register RxxV.

Prior to performing integer multiplication, DFMPYLH applies a mask to zero the sign bit (e.g., sign bit 224) and the exponent (e.g., Exp-B 225) of the second operand, depicted in Example 2 as function zxt_{20→64}. DFMPYLH also adds the implied 1 bit to the portion of the significand (e.g., Sig-Hi-B 226) of the second operand, depicted in Example 2 as a bit-wise OR of the hexadecimal value "00100000" to insert a "1" into the 12$^{th}$ bit position of the masked second operand. DFMPYLH also left-shifts the product by one bit prior to accumulation because the 0$^{th}$ bit in RxxV is used as a sticky bit.

```
DFMPYLH
{
    RxxV += (RssV.uw[0] * (0x00100000 | zxt_{20->64}(RttV.uw[1]))) << 1;
}
```

Example 2

Executing the third integer multiply instruction 136 causes the 32-bit integer multiplier 112 to perform integer multiplication of high-order significand bits Sig-Hi-A 216 of the first operand 122 with the low-order significand bits Sig-Lo-B 227 of the second operand 124 to generate a 53-bit value 252. The value 252 is added to the value 244 to generate the 55-bit intermediate result 142 (and the sticky bit 235). In an example, the third integer multiply instruction 136 is a DFMPYLH instruction as depicted in Example 2. The intermediate result 142 may therefore include a sum of partial products (e.g., the values 232, 242, and 252) and no exponent is used in the first three operations associated with the instructions 132, 134, and 136.

The special purpose floating point multiply accumulate instruction 140 is executed with respect to the intermediate result 142 and at least one floating point operand to generate the final floating point multiplication result 144. For example, the instruction 140 causes the processor to perform a floating point multiplication of the first portion 211 of operand A 122 (the higher-order bits of the first operand) and the first portion 221 of operand B 124 (the higher-order bits of the second operand) to generate high-order significand bits of a floating point value. To illustrate, the floating point multiplication includes integer multiplication of Sig-Hi-A 216 with Sig-Hi-B 226 to generate a 42-bit value partial mantissa 262. The 42-bit value 262 is accumulated with (e.g., added to) the intermediate result 142 to generate a value 263 which is rounded to form a 53-bit value 264. Executing the instruction 140 also includes multiplying the sign bits 214, 224 to generate a sign bit 274 and adding the exponents 215, 225 to generate an exponent 275. The final floating point multiplication result 144 is a 64-bit data word that includes the sign bit 274, the exponent 275, and the 53-bit value 254 as the significand (mantissa) 276.

In an example, the special purpose floating point multiply accumulate instruction 140 is a double float multiply high-high (DFMPYHH) instruction that behaves like a single-precision floating-point multiply-add using the upper 20 significand bits of the first operand (e.g., Sig-Hi-A 216) and the upper 20 significand bits of the second operand (e.g., Sig-Hi-B 226), zeroes the sign and exponent fields, and sets the implied bits of each operand in a manner similar to Example 2. The product is aligned and added to a third operand (e.g., the intermediate value 142, a 55-bit addend) which contains the sum of the previous instructions 132, 134, and 136. The final sign, exponent, and fraction fields are combined to form the final result 144.

In another aspect, one or both of the operands A 122 or B 124 are "denormal" (or "subnormal"). In a "normalized" format, the exponent is non-zero and an implied "1" bit precedes the most significant bit of the significand. In contrast to the normalized format, a denormal operand has an all-zeros value of the exponent 215 or 225 and does not include an implied "1" bit. A normalize instruction 270 may be executed to detect whether operand A 122 or operand B 124 is denormal and to modify operand A, operand B, or both, so that the inputs to the following instructions 132, 134, 136, and 140 have a normalized format.

For example, the normalize instruction 270 may cause the processor 100 to identify a first operand (e.g., operand A 122) of a multi-operand multiply operation as denormal and, in response to determining that an exponent of a second operand (e.g., operand B 124) of the multi-operand operation is larger than a threshold, to modify a value of at least one of the first operand (e.g., operand A 122) or the second operand (e.g., operand B 124). For example, the IEEE-754 format includes biasing the exponent of a double-precision number by adding 1023 to the exponent, so that the lowest supported exponent value (e.g., −1023) is represented as 0 in the exponent field. If the exponent field of operand A 122 has a value of 0 (i.e., Exp-A 215 is 0), the magnitude of operand A 122 is smaller than $2^{-1023}$ and operand A 122 is identified as denormal. If the magnitude of operand B 124 is also very small (less than a threshold, such as having an unbiased exponent that is less than −511), the product of operand A 122 and operand B 124 is too small to be accurately represented in the IEEE-754 format, and a 0 value may be returned. Otherwise, the exponent of operand B 124 is reduced by a particular amount, and the exponent of operand A 122 is increased by the particular amount, so that neither operand is denormal. Reducing the exponent of the normalized operand may include multiplication of the operand by a first scaling factor, and increasing the exponent of the denormal operand may include multiplication of the denormal operand by a second scaling factor that is the multiplicative inverse of the first scaling factor (e.g., A'=A*f, B'=B*(1/f), (where f is a scaling factor>1) so that both A' and B' are normalized and A'*B'=A*B).

In an example, the normalize instruction 270 includes a double float multiply fix (DFMPYFIX) instruction that takes two double precision operands and gives one result. DFMPYFIX is configured to be used twice, where the second time the operands are reversed such that both operands are conditioned. For example, a modified first operand R1' may be generated as R1'=DFMPYFIX (R1, R2), and a modified second operand R2' may be generated as R2'=DFMPYFIX (R2, R1). In a particular implementation, if operand A 122 has a denormal format and operand B 124 has an unbiased exponent greater than or equal to −511, then the result of DFMPYFIX (A, B) is (operand A)*1.0*2^52 (i.e., the exponent of A is increased by 52). If operand A has an unbiased exponent greater than or equal to −511 and operand B is denormal then the result of DFMPYFIX (A, B) is (operand A)*(1.0)*(2^−52) (i.e., the exponent of A is decreased by 52).

The example 200 thus depicts generating the final multiplication result 144 of multiplying two 64-bit operands by performing a denormalizing operation (via execution of the normalize instruction 270), followed by four multiply-accumulate operations corresponding to the three integer multiply instructions 132, 134, and 136 and the special float multiply-accumulate instruction 140. Each of the multiply-accumulate operations is performed responsive to the corresponding instruction 132, 134, 136, or 140 using 32-bit (or smaller) operands. Therefore, the multiplication operation can be performed without using a large, full-precision multiplier and without using complex control logic and multiplexing to "quadruple pump" a 32-bit multiplier.

Although FIG. 2 depicts two operands 122, 124 of the multiply instruction 130, in other implementations the multiply instruction 130 has a single operand, such as an implementation in which the multiply instruction 130 is an instruction to generate the square of the single operand. In other implementations, the multiply instruction 130 has three or more operands to be multiplied together and is processed using the instructions 132-140 to generate the result 144 for multiplying two of the operands, and the instructions 132-140 are again used to multiply the result 144 with the third operand.

Although FIG. 2 depicts an implementation in which the processor 100 supports the normalize instruction 270, in other implementations the normalize instruction 270 is not supported. In an illustrative example, the processor 100 raises an interrupt to halt processing of the multiply operation upon determining that one or more operand is denormal.

Figure 3:
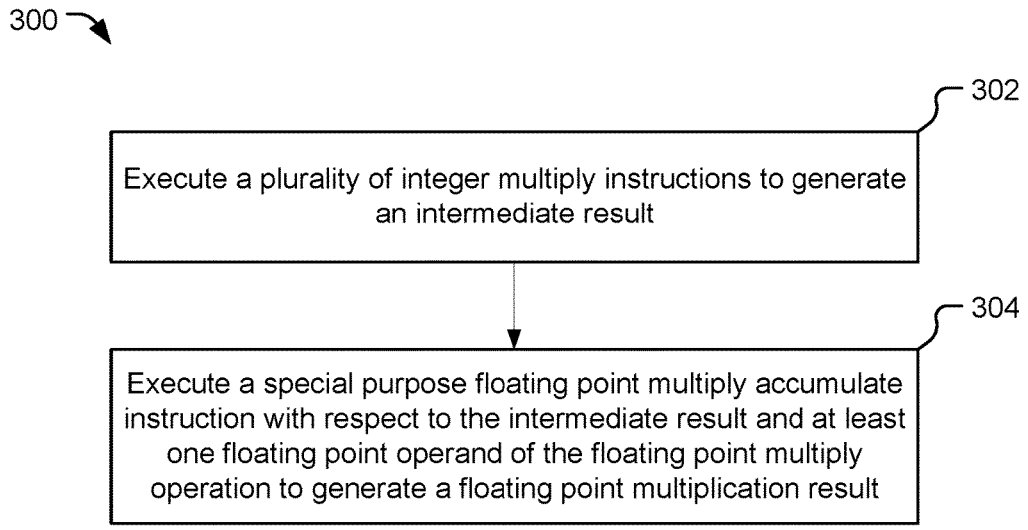
FIG. 3 is a flow chart of a particular implementation of a method of performing a floating point multiply operation using multiple integer multiply instructions and a special purpose floating point multiply instruction that may be performed by the processor of FIG. 1.

FIG. 3 depicts an example of a method 300 of performing a floating point multiply operation at a processor. For example, the method 300 may be performed by the processor 100 of FIG. 1.

The method 300 includes executing a plurality of integer multiply instructions to generate an intermediate result, at 302. In a particular implementation, the plurality of integer multiply instructions includes a first instruction to perform integer multiplication of low-order significand bits of a first operand with low-order significand bits of a second operand to generate a first value, such as the first integer multiply instruction 132. In the particular implementation, the plurality of integer multiply instructions includes a second instruction to perform integer multiplication of the low-order significand bits of the first operand and high-order significand bits of the second operand to generate a second value, such as the second integer multiply instruction 134. In the particular implementation, the plurality of integer multiply instructions includes a third instruction to perform integer multiplication of the low-order significand bits of the second operand and high-order significand bits of the first operand to generate a third value, such as the third integer multiply instruction 136.

In an illustrative example, the intermediate result corresponds to a sum of the third value, the second value, and a reduced-length version of the first value, such as the intermediate result 142. In some implementations, the intermediate value includes a dedicated bit that indicates whether the reduced-length version of the first value is inexact, such as the sticky bit 235 of FIG. 2.

A special purpose floating point multiply accumulate instruction is executed with respect to the intermediate result and at least one floating point operand of the floating point multiply operation to generate a floating point multiplication result, at 304. In a particular implementation, the special purpose multiply-accumulate instruction 140 of FIG. 1 causes the processor to perform floating-point multiplication that includes multiplying high-order significand bits of a first operand (e.g., Sig-Hi-A 216) with high-order significand bits of a second operand (e.g., Sig-Hi-B 226) to generate high-order significand bits of a floating point value, and to accumulate the high-order significand bits with the intermediate value (e.g., the intermediate result 142) to generate the final floating point multiplication result 144.

In some implementations the method 300 includes, prior to executing the plurality of integer multiply instructions, receiving a floating point multiply instruction and replacing the floating point multiply instruction with the plurality of integer multiply instructions and the special purpose floating point multiply accumulate instruction. As a particular example, the instruction translator 102 (e.g., a decoder) replaces the floating point multiply instruction 103 with the plurality of integer multiply instructions 138 and the special purpose floating point MAC instruction 140.

In some implementations, the method 300 also includes, in response to receiving the floating point multiply instruction, determining whether a first operand of the floating point multiply operation is denormal. In response to determining that the first operand is denormal and that an exponent of a second operand of the floating point multiply operation is larger than a threshold, a value of at least one of the first operand or the second operand is modified (e.g., via execution of the normalize instruction 270 of FIG. 2), such as described further with reference to FIG. 4.

Execution of the plurality of integer multiple instructions and the special purpose floating point multiply accumulate instruction enables the processor to multiply two operands having large bit width using components configured to process operands having smaller bit widths, reducing the cost and size of the processor as compared to processors having a dedicated full-precision multiplier and reducing processor routing logic and complexity as compared to executing the multiply instruction using a looping operation.

Figure 4:
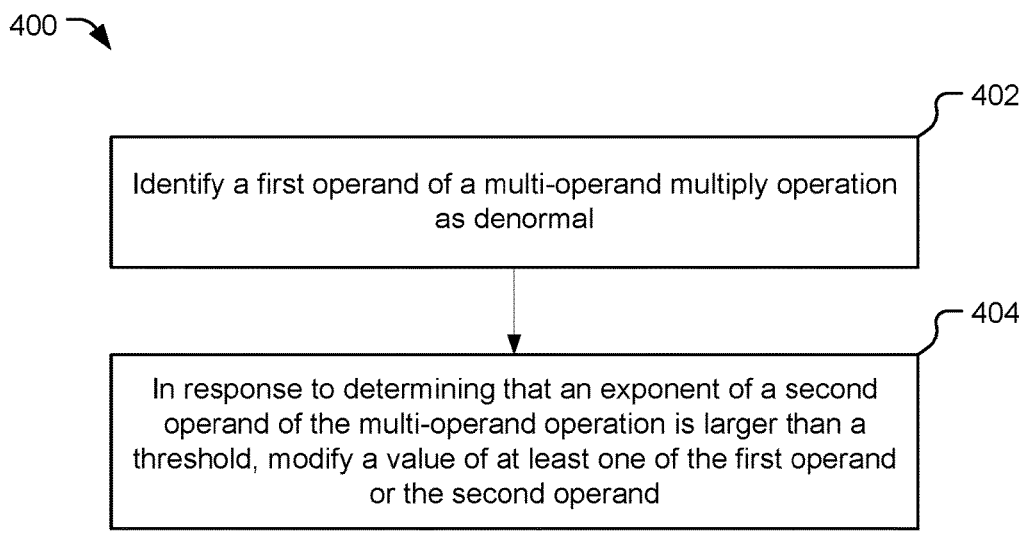
FIG. 4 is a flow chart of a particular implementation of a method of operating a processor to modify a denormal operand of a multiplication operation that may be performed by the processor of FIG. 1.

FIG. 4 depicts an example of a method 400 of modifying a denormal operand of a multiplication operation. In a particular example, the method 400 is performed by the processor 100 of FIG. 1.

The method 400 includes identifying a first operand of a multi-operand multiply operation as denormal, at 402. In a particular example, the processor 100 checks the first operand 122 and the second operand 124 to determine whether either (or both) of the operands is denormal as part of executing the normalize instruction 270 of FIG. 2. In some implementations, identifying an operand as denormal includes determining whether the exponent value of the operand is zero (indicating the operand is denormal) or non-zero (indicating the operand is not denormal).

In response to determining that an exponent of a second operand of the multi-operand operation is larger than a threshold, a value of at least one of the first operand or the second operand is modified, at 404. To illustrate, the processor 100 executes the normalize instruction 270 to convert the denormal operand to a non-denormal operand by increasing the exponent of the denormal operand and decreasing the exponent of the other (non-denormal) operand such that the product of the two modified operands equals the product of the two operands prior to modification.

In some implementations, after normalizing a denormal operand, the method 400 includes executing a plurality of integer multiply instructions (e.g., the plurality 138 of integer multiply instructions) using the modified value of the at least one of the first operand or the second operand to generate an intermediate result and executing a special purpose floating point multiply accumulate instruction (e.g., the special purpose floating point MAC instruction 140) with respect to the intermediate result and at least one floating point operand to generate a final floating point multiplication result.

Modifying the exponent values enables multiplication to be performed without requiring the processor to support of special purpose multiplication instructions for denormal operands. By increasing the exponent of the denormal operand and decreasing the exponent of the other operands, both operands may be processed using instructions for "normal" operands without affecting the final floating point multiplication result.

Figure 5:
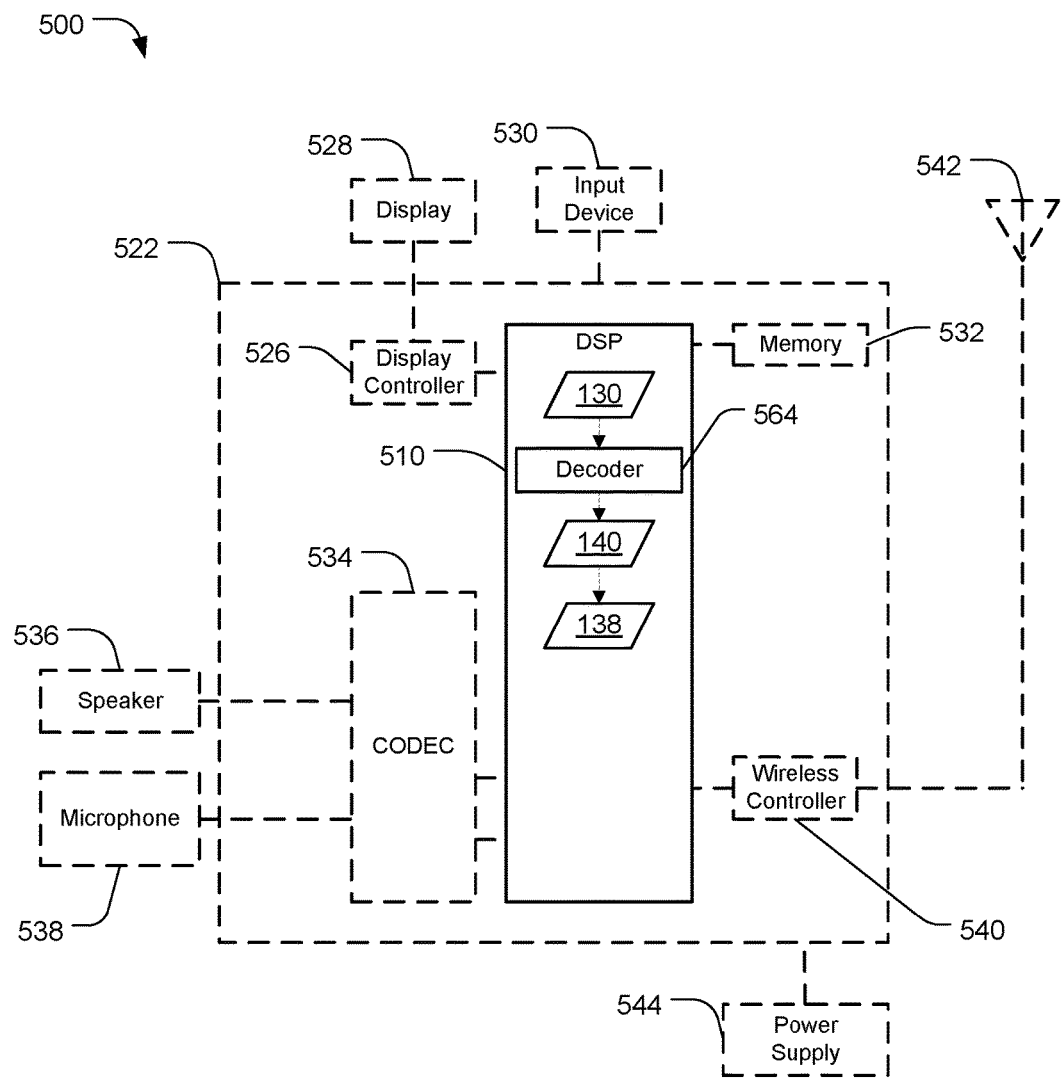
FIG. 5 is a block diagram of portable device including a processor that includes the processor of FIG. 1.

Referring to FIG. 5, a block diagram of a particular illustrative implementation of an electronic device including the processor 100 is depicted and generally designated 500. The electronic device 500 corresponds to any kind of computing device. Although FIG. 5 includes implementation-specific components (illustrated via broken lines) that are associated with an implementation of the electronic device 500 as a mobile device configured to perform wireless communications, it should be clearly understood that the electronic device 500 is not limited to wireless communications and is not limited to a mobile context. Thus, one or more components illustrated using broken lines may be excluded, one or more other components may be added, or a combination thereof, in various implementations. In example implementations, the electronic device 500 corresponds to a computer (e.g., a server, a laptop computer, a tablet computer, or a desktop computer), a wearable electronic device (e.g., a personal camera, a head-mounted display, or a watch), a vehicle control system or console, a home appliance, a set top box, an entertainment unit, a navigation device, a television, a monitor, a tuner, a radio (e.g., a satellite radio), a music player (e.g., a digital music player or a portable music player), a video player (e.g., a digital video player, such as a digital video disc (DVD) player or a portable digital video player), a robot, a healthcare device, another electronic device, or a combination thereof.

The device 500 includes a processor 510, such as a digital signal processor (DSP). In an illustrative example, the processor 510 is implemented using the processor 100 and is configured to perform a floating point multiply operation by execution of the plurality of integer multiply operations 138 and the special-purpose floating point MAC instruction 140. The processor 510 includes a decoder 564 (e.g., the instruction translator 102) that replaces the floating point multiply instruction 130 with the plurality of integer multiply instructions 138 and the special purpose floating point MAC instruction 140.

In some implementations, a memory 532 is coupled to or integrated within the processor 510. The memory 532 may include random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), one or more registers, a hard disk, a removable disk, a compact disc read-only memory (CD-ROM), another storage device, or a combination thereof. The memory 532 stores one or more instructions that are executable by the processor 510 to perform operations, such as the method 300 of FIG. 3, the method 400 of FIG. 4, or a combination thereof.

In some implementations, a display controller 526 is coupled to the digital signal processor 510 and to a display 528. In some implementations, a coder/decoder (CODEC) 534 is coupled to the digital signal processor 510, and a speaker 536 and microphone 538 are coupled to the CODEC 534.

In some implementations, a wireless controller 540 is coupled to the processor 510 and to an antenna 542. In a particular implementation, the processor 510, the display controller 526, the memory 532, the CODEC 534, and the wireless controller 540, are included in a system-in-package or system-on-chip device 522. In a particular implementation, an input device 530 and a power supply 544 are coupled to the system-on-chip device 522. Moreover, in a particular implementation, as illustrated in FIG. 5, the display 528, the input device 530, the speaker 536, the microphone 538, the antenna 542, and the power supply 544 are external to the system-on-chip device 522. However, each of the display 528, the input device 530, the speaker 536, the microphone 538, the antenna 542, and the power supply 544 can be coupled to a component of the system-on-chip device 522, such as an interface or a controller.

The foregoing disclosed devices and functionalities, e.g., as described in reference to any one or more of FIGS. 1-5, may be designed and configured into computer files (e.g., RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above.

In connection with the disclosed examples, a non-transitory computer-readable medium (e.g., the memory 532) stores instructions that are executable by a processor (e.g., the processor 100 or the processor 510) to perform a floating point multiply operation by executing a plurality of integer multiply instructions to generate an intermediate result and executing a special purpose floating point multiply accumulate instruction with respect to the intermediate result and at least one floating point operand to generate a final floating point multiplication result. For example, in a particular aspect the memory 532 stores instructions to cause the processor 510 to perform the method 300 of FIG. 3, the method 400 of FIG. 4, or any combination thereof.

In conjunction with the disclosed examples, an apparatus includes means for executing a plurality of integer multiply instructions to generate an intermediate result. For example, the means for executing the plurality of integer multiply instructions may correspond to the integer multiplier 112 of FIG. 1, one or more other circuits or devices to execute a plurality of integer multiply instructions, or any combination thereof.

The apparatus also includes means for executing a special purpose floating point multiply accumulate instruction with respect to the intermediate result and at least one floating point operand to generate a final floating point multiplication result. For example, the means for executing the special purpose floating point multiply operation may correspond to the floating point multiplier 114 of FIG. 1, one or more other circuits or devices to execute the special purpose floating point multiply accumulate instruction, or any combination thereof.

In some implementations, the apparatus includes means for replacing a floating point multiply instruction with the plurality of integer multiply instructions and the special purpose floating point multiply accumulate instruction. For example, the apparatus may include the instruction translator 102 of FIG. 1 (e.g., a decoder), one or more other circuits or devices configured to replace the floating point multiply instruction with the plurality of integer multiply instructions and the special purpose floating point multiply accumulate instruction, or any combination thereof.

In some implementations, the apparatus includes means for storing the intermediate result, and the intermediate result corresponds to a sum of the third value, the second value, and a reduced-length version of the first value. For example, the means for storing the intermediate result may correspond to one or more registers (e.g., in the register file 126 of FIG. 1), one or more other latches, flip-flops, memory devices (e.g., random access memory (RAM)), or other circuits or devices configured to store the intermediate result, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Portions of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A processor comprising:
   an integer multiplier configured to execute an integer multiply instruction to multiply significand bits of at least one floating point operand of a floating point multiply operation to generate an intermediate result; and
   a floating point multiplier configured to execute a special purpose floating point multiply accumulate instruction with respect to the intermediate result and the at least one floating point operand to generate a final floating point multiplication result.

2. The processor of claim 1, wherein the integer multiply instruction includes at least one of:
   a first instruction to perform integer multiplication of low-order significand bits of the at least one floating point operand with low-order significand bits of a second operand to generate a first value;
a second instruction to perform integer multiplication of the low-order significand bits of the at least one floating point operand and high-order significand bits of the second operand to generate a second value; or
a third instruction to perform integer multiplication of the low-order significand bits of the second operand and high-order significand bits of the at least one floating point operand to generate a third value.

3. The processor of claim 2, further comprising a register configured to store the intermediate result, and wherein the intermediate result corresponds to a sum of the third value, the second value, and a reduced-length version of the first value.

4. The processor of claim 3, wherein the intermediate value includes a dedicated bit that indicates whether the reduced-length version of the first value is inexact.

5. The processor of claim 1, wherein the floating point multiplier is configured to execute the special purpose floating point multiply accumulate instruction by:
performing floating-point multiplication that includes multiplying high-order significand bits of the at least one floating point operand with high-order significand bits of a second operand to generate high-order significand bits of a floating point value; and
accumulating the high-order significand bits with the intermediate result to generate the final floating point multiplication result.

6. The processor of claim 1, further comprising a decoder configured to replace a received floating point multiply instruction with a set of instructions that includes a plurality of integer multiply instructions and the special purpose floating point multiply accumulate instruction.

7. The processor of claim 6, wherein the set of instructions further includes an instruction that is executable to:
determine whether the at least one floating point operand of the floating point multiply operation is denormal; and
in response to determining that the at least one floating point operand is denormal and that an exponent of a second operand of the floating point multiply operation is larger than a threshold, modify a value of at least one of the at least one floating point operand or the second operand.

8. A method of performing a floating point multiply operation at a processor, the method comprising:
executing, by an integer multiplier, a plurality of integer multiply instructions to multiply significand bits of at least one floating point operand of the floating point multiply operation to generate an intermediate result; and
executing, by a floating point multiplier, a special purpose floating point multiply accumulate instruction with respect to the intermediate result and the at least one floating point operand of the floating point multiply operation to generate a floating point multiplication result.

9. The method of claim 8, wherein the plurality of integer multiply instructions includes:
a first instruction to perform integer multiplication of low-order significand bits of the at least one floating point operand with low-order significand bits of a second operand to generate a first value;
a second instruction to perform integer multiplication of the low-order significand bits of the at least one floating point operand and high-order significand bits of the second operand to generate a second value; and
a third instruction to perform integer multiplication of the low-order significand bits of the second operand and high-order significand bits of the at least one floating point operand to generate a third value.

10. The method of claim 9, wherein the intermediate result corresponds to a sum of the third value, the second value, and a reduced-length version of the first value.

11. The method of claim 10, wherein the intermediate value includes a dedicated bit that indicates whether the reduced-length version of the first value is inexact.

12. The method of claim 8, wherein executing the special purpose floating point multiply accumulate instruction causes the processor to:
perform floating-point multiplication that includes multiplying high-order significand bits of the at least one floating point operand with high-order significand bits of a second operand to generate high-order significand bits of a floating point value; and
accumulate the high-order significand bits with the intermediate result to generate the floating point multiplication result.

13. The method of claim 8, further comprising, prior to executing the plurality of integer multiply instructions:
receiving a floating point multiply instruction; and
replacing the floating point multiply instruction with the plurality of integer multiply instructions and the special purpose floating point multiply accumulate instruction.

14. The method of claim 13, further comprising, in response to receiving the floating point multiply instruction:
determining whether the at least one floating point operand of the floating point multiply operation is denormal; and
in response to determining that the at least one floating point operand is denormal and that an exponent of a second operand of the floating point multiply operation is larger than a threshold, modifying a value of at least one of the at least one floating point operand or the second operand.

15. An apparatus comprising:
means for executing a plurality of integer multiply instructions to multiply significand bits of at least one floating point operand of a floating point multiply operation to generate an intermediate result; and
means for executing a special purpose floating point multiply accumulate instruction with respect to the intermediate result and the at least one floating point operand to generate a final floating point multiplication result.

16. The apparatus of claim 15, further comprising means for replacing a floating point multiply instruction with the plurality of integer multiply instructions and the special purpose floating point multiply accumulate instruction.

17. The apparatus of claim 15, wherein the plurality of integer multiply instructions includes:
a first instruction to perform integer multiplication of low-order significand bits of the at least one floating point operand with low-order significand bits of a second operand to generate a first value;
a second instruction to perform integer multiplication of the low-order significand bits of the at least one floating point operand and high-order significand bits of the second operand to generate a second value; and
a third instruction to perform integer multiplication of the low-order significand bits of the second operand and high-order significand bits of the at least one floating point operand to generate a third value.

18. The apparatus of claim 17, further comprising means for storing the intermediate result, and wherein the intermediate result corresponds to a sum of the third value, the second value, and a reduced-length version of the first value.

19. A method comprising:
identifying a first operand of a multi-operand floating-point multiply operation as denormal;
in response to determining that an exponent of a second operand of the multi-operand floating-point operation is larger than a threshold, modifying a value of at least one of the first operand or the second operand;
executing, at an integer multiplier, at least one integer multiply instruction using the modified value to generate an intermediate result of the multi-operand floating-point multiply operation, and
generating, at a floating point multiplier, a final result of the multi-operand floating-point multiply operation at least partially based on the intermediate result.

20. The method of claim 19, wherein generating the final result of the multi-operand floating-point multiply operation includes
executing, at the floating point multiplier, a special purpose floating point multiply accumulate instruction with respect to the intermediate result and at least one floating point operand.

* * * * *